United States Patent [19]

Bussey et al.

[11] Patent Number: 4,714,998

[45] Date of Patent: Dec. 22, 1987

[54] FUEL INJECTION SYSTEM MONITORING EQUIPMENT

[75] Inventors: Stephen Bussey, Buckingham; Barry Cockburn, Gawcott; Alastair E. F. Heath, Great Horwood, all of England

[73] Assignee: Leslie Hartridge Limited, Buckinghamshire, England

[21] Appl. No.: 700,443

[22] Filed: Feb. 8, 1985

[30] Foreign Application Priority Data

Feb. 13, 1984 [GB] United Kingdom ................ 8403749

[51] Int. Cl.[4] ........................ G06F 3/14; G01M 15/00

[52] U.S. Cl. ............................ 364/431.01; 73/119 A; 364/551; 364/564

[58] Field of Search ........... 364/550, 551, 424, 431.01, 364/564; 73/119 A

[56] References Cited

U.S. PATENT DOCUMENTS

| | | | |
|---|---|---|---|
| 4,058,709 | 11/1977 | Long | 364/424 |
| 4,218,744 | 8/1980 | Pratt et al. | 364/431.01 X |
| 4,227,402 | 10/1980 | Dooley et al. | 73/119 A X |
| 4,362,052 | 12/1982 | Heath et al. | 73/119 A |
| 4,391,133 | 7/1983 | Ito | 73/119 A |
| 4,437,342 | 3/1984 | Hosaka et al. | 73/119 A |
| 4,453,403 | 6/1984 | Bussey et al. | 73/119 A |
| 4,497,201 | 2/1985 | Allen et al. | 73/119 A |

*Primary Examiner*—Felix D. Gruber

*Attorney, Agent, or Firm*—Berman, Aisenberg & Platt

[57] ABSTRACT

The equipment measures the volume of fluid injected by each injector of the system, and possibly also the relative pulses of the different lines, by measuring the volume of fuel, and possibly also the angle of turn of the injector shaft between commencements of injections of the different lines. To provide signals indicative of the commencements of injection in the various lines, circuitry is provided which comprises a single commencement of injection detector for at least one of the lines, a counter which generates pulses at a rate proportional to the revolutionary speed of the pump shaft and which is reset following the issue of a reset signal, and an artificial commencement of injection pulse generator which generates artificial commencement of injection signals for the various lines of the pump according to a predetermined count of pulses from the counter since the latter was reset following the issue of a signal from the detector. To measure the relative phases of the different lines, the detector is positioned in a common gallery downstream of all the injectors, and a count is made between successive commencements of injection.

7 Claims, 13 Drawing Figures

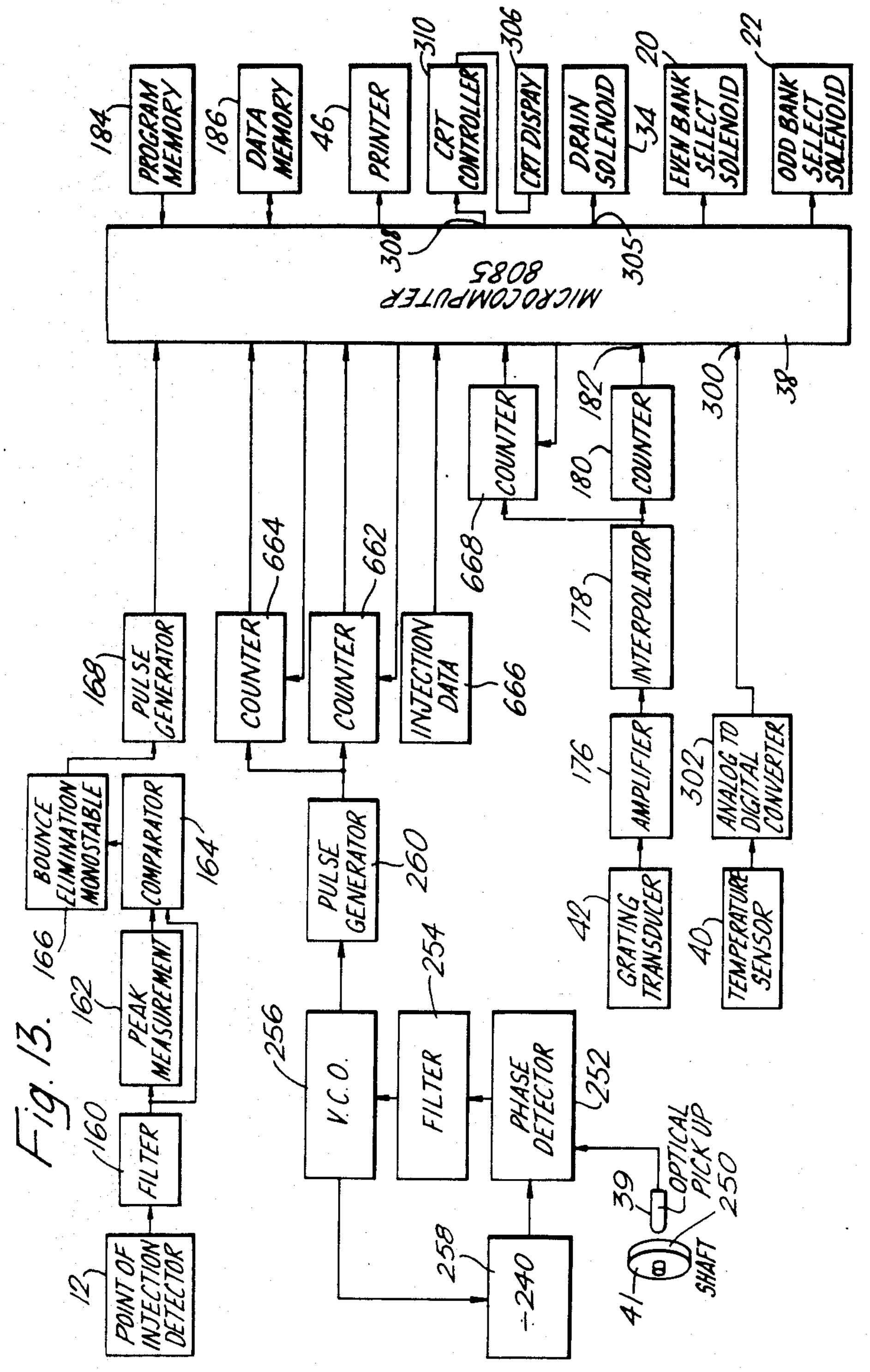
Fig. 13.
PROGRAM MEMORY
DATA MEMORY
PRINTER
CRT CONTROLLER
CRT DISPAY
DRAIN SOLENOID
EVEN BANK SELECT SOLENOID
ODD BANK SELECT SOLENOID
MICROCOMPUTER 8085
COUNTER
COUNTER
INTERPOLATOR
AMPLIFIER
GRATING TRANSDUCER
ANALOG TO DIGITAL CONVERTER
TEMPERATURE SENSOR
PULSE GENERATOR
COUNTER
COUNTER
INJECTION DATA
BOUNCE ELIMINATION MONOSTABLE
COMPARATOR
PEAK MEASUREMENT
FILTER
POINT OF INJECTION DETECTOR
PULSE GENERATOR
V.C.O.
FILTER
PHASE DETECTOR
÷240
OPTICAL PICK UP
SHAFT
184
186
46
310
306
20
22
34
308
305
38
300
182
180
668
664
662
666
178
176
42
302
40
168
166
164
162
160
12
260
256
254
252
258
39
250
41

FUEL INJECTION SYSTEM MONITORING EQUIPMENT

This invention relates to a signal generator for use in monitoring a multi-line fuel injection system, and may for example be used in volumetric metering equipment which measures the volume of test fluid pumped through the individual injectors of a multi-line fuel injection system for an internal combustion engine when the system is on test.

One shortcoming of previous metering units is that they cannot provide information on any individual injection of an individual injector. Furthermore, the total volume of a large number of injections has to be measured to give the required accuracy.

In U.S. Pat. No. 4,453,403, filed on 31st Aug., 1982 and issued on 12th June, 1984, we describe volumetric metering equipment comprising connection or mounting means by which an injector of a fuel injection system can be connected to or mounted on the equipment, a measuring device which is in communication with the connection or mounting means via at least one passageway to allow test fluid to pass from such an injector to the measuring device when the equipment is in use, the measuring device being constructed to receive test fluid continuously from a succession of individual injections and to provide a signal or signals which are indicative of the amount of test fluid received by the device, and means arranged in relation to a part of the equipment, or a part of such a system when the equipment is in use, for determining which of the signals, or values of the signal, relate to each of a succession of individual injections. The equipment illustrated in that earlier Application of ours has means for so connecting the measuring device that it is open, at the same time, to receive test fluid from more that one injector or group of injectors of a multi-line fuel injection system which is on test. The detection means comprise a plurality of detectors arranged to detect which injector or group of injectors is responsible for each successive injection.

One disadvantage of such equipment is the expense and complexity of manufacture involved in providing a detector for each line.

An aim of the present invention is to overcome this disadvantage.

Accordingly, the present invention is directed to an injection system monitoring equipment for metering the outputs from the different lines of a multi-line fuel injection system, comprising (a) a plurality of inputs to which respective lines of a multiple fuel injection system are connected when the equipment is in use, (b) a single commencement of injection detector for at least one of the lines positioned, when the equipment is in use, to detect the commencement of injection of that line in such a pump and to issue a commencement of injection signal upon such detection, (c) a commencement of injection pulse generator connected to receive commencement of injection signals from the commencement of injection detector and to issue a commencement of injection pulse upon receipt of a signal from the commencement of injection detector, (d) a fuel injection pump running speed indicator positioned when the circuitry is in use, to pick-up the rotational speed of the pump shaft and to issue indicator pulses at an output of the running speed indicator, at a rate which is proportional to that rotational speed, (e) a counter having an input connected to receive the said indicator pulses to provide a count of such pulses received by the counter, and a reset input connected to receive commencement of injection pulses from said commencement of injection pulse generator, so that the counter is reset when it receives a commencement of injection pulse, (f) an artificial commencement of injection pulse generator connected to said counter to generate an artificial commencement of injection pulse in dependence upon the count in the counter having a predetermined value representing a predetermined fraction of the time interval between two successive real commencement of injection pulses, whereby artificial commencement of injections pulses are generated for at least one line other than said one of the lines, (g) volumetric measure means connected to receive liquid from all the inputs and to produce metering signals indicative of the volume of liquid which passes into said measure means from the different lines, and (h) volumetric measure indicator means connected to receive pulses from said artificial commencement of injection pulse generator and to receive signals from said volumetric measure means, to provide an indication of the volume of liquid received by said volumetric measure means between two successive pulses from said artificial commencement of injection pulse generator.

The present invention also extends to commencement of injection indicator circuitry for use in metering the outputs from the different lines of a multi-line fuel injection system, comprising (a) a single commencement of injection detector for at least one of the lines positioned, when the circuitry is in use, to detect the commencement of injection of that line in such a pump and to issue a commencement of injection signal upon such detection, (b) a commencement of injection pulse generator connected to receive commencement of injection signals from the commencement of injection detector and to issue a commencement of injection pulse upon receipt of a signal from the commencement of injection detector, (c) a fuel injection pump running speed indicator positioned, when the circuitry is in use, to pick up the rotational speed of the pump shaft and to issue indicator pulses at an output of the running speed indicator, at a rate which is proportional to that rotational speed, (d) a counter having an input connected to receive the said indicator pulses to provide a count of such pulses received by the counter, and a reset input connected to receive commencement of injection pulses from said commencement of injection pulse generator, so that the counter is reset when it receives a commencement of injection pulse, and (e) an artificial commencement of injection pulse generator connected to said counter to generate an artificial commencement of injection pulse in dependence upon the count in the counter having a predetermined value representing a predetermined fraction of the time interval between two successive real commencement of injection pulses, whereby artificial commencement of injection pulses are generated for at least one line other than said one of the lines.

In one possible construction of the detector, there is a cavity for receiving liquid from at least one injector, and a pressure sensor in or in communication with the cavity, arranged to detect when test liquid is shot out through the nozzle of the injector. The pressure sensor may be a piezoelectric transducer, such as is disclosed in co-pending U.S. patent application Ser. No. 460,820 filed on 25th Jan., 1983 with priority from 1st Feb., 1982. It has been found that such a transducer will work particularly effectively if its piezoelectric crystal is retained loosely. This is the particular construction of detection means used in the equipment illustrated in our earlier application. With one piezoelectric transducer or other detector per line, problems have arisen regarding cross-talk between lines and instability of fluid flow and pressure within the system. Thus the application of the invention using one piezoelectric transducer or other detector for one line only, or one detector common to all lines but with a selectively operable valve for each line so that one selected line can be switched in to the exclusion of the selected line can be switched in to the exclusion of the others, is particularly advantageous.

In previously proposed metering units the volume of test fluid delivered by each injector or group of injectors has been measured over a predetermined number of injections. This process is repeated for each line or group of lines of the system in turn, with the result that the complete metering procedure for the injection system can be a relatively long process, unless respective measuring devices are provided for all the injectors, in which case the metering equipment becomes very expensive. Metering equipment can be made in accordance with the present invention in which the time of the overall metering procedure is reduced without unduly increasing the cost of the metering equipment. To this end, the metering equipment may be provided with means for so connecting volumetric measure means that the latter is open, at the same time, to receive test liquid from more than one injector or group of injectors of a fuel injection system which is on test.

There may be recording means connected to receive signals from the measure means and the detector means to provide a record of the respective volumes of test fluid, ejected over a given period of operation or over a given number of injections, from the individual injectors or groups of injectors, the metering procedure for more than one injector or group of injectors thus being performed over the same period of operation or over the same number of injections from each injector.

A detector other than a piezoelectric transducer may be used. For example, a pressure transducer comprising a strain gauge or a needle lift transducer, or an arrangement comprising a port and a leaf-spring with an associated magnet and magnetic pick-up head, or an acoustic pick-up such as a microphone or a microwave detector may be suitably arranged to provide indications of each commencement of injection, which normally occurs when the pressure of the test fluid in equipment downstream of the detector has settled down to a steady value following the immediately preceding injection.

The processing of the information obtained from the various signal outputs can be performed with sufficient speed and accuracy by means of a computer connected to those outputs. The volumetric measurement of each injection performed by measure means of the equipment may be fed into a store in the computer associated with the particular injector responsible for that injection. The current store is identified according to which line is associated with the input signal which is fed to the computer at that time.

If the indicator signals are commencement-of-injection signals, the measured volume of the liquid which passes into the measure means between successive commencement of injection signals gives the size of the injection from the injector associated with the first of those signals. In other words, the measured value received by the computer or stored in the computer when a commencement of injection signal is received relates to the injector associated with the immediately preceding signal.

It is preferable to provide circuitry with the detector, for example, a monostable multivibrator, which switches to an "on" state for a predetermined short interval following the instant of detection. This ensures that the circuitry is not switched erroneously by echo, bounce or extensive noise generated mechanically or electrically following the instant of detection.

It is possible, if the rotary speed of the injection system pump exceeds a predetermined value, that the interval between successive injections will be less than the time taken for a transient or transients associated with the measuring device to decay. To avoid erroneous measurements that would occur as a result, valve means may be connected between the injector system and measuring device to allow, for example, only lines from alternate injectors, say, all the even numbered injectors, to be open to the measuring device for a first measuring procedure, and then the lines from the other injectors, say all the odd numbered injectors, in a second measuring procedure. The injectors are numbered in this sense in line delivery order. The interval between successive injections which are passed to the measuring device will then be twice as long, ensuring that, when each associated signal is issued, the transient or transients associated with the measuring device have decayed.

An example of a volumetric metering unit incorporating the present invention is illustrated in the accompanying diagrammatic drawings, in which:

FIG. 13 shows a block circuit diagram of electrical circuitry of the unit shown in FIG. 12.

Figure 1:
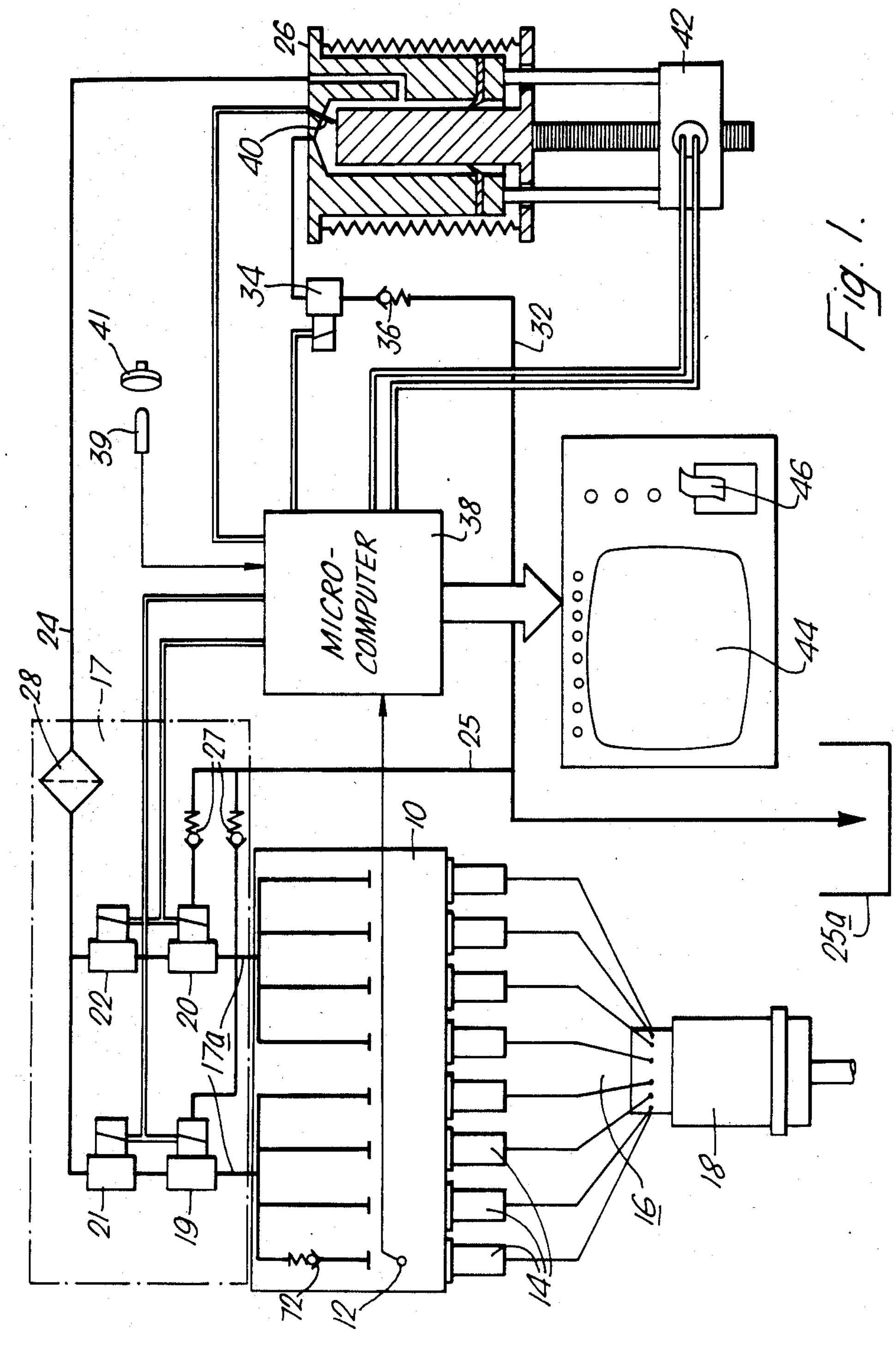
FIG. 1 is a schematic diagram of the unit.

The basic arrangement of the volumetric metering unit will first be described with reference to FIG. 1. It comprises an injector connector or mounting block 10 which has one commencement of injection detector 12 positioned adjacent to injector number 1 of eight injectors 14 of an eight-line fuel injection system 16 which also includes a fuel injection pump 18. It will be appreciated that the unit could easily be modified for testing a twelve-line system, or a one-line system or any system with more than one line.

A manifold block 17 having two inlet connections 17*a*, is provided with two diverter valves 19 and 20, and two isolating valves 21 and 22 connected to selectively allow fluid to flow from the lines connected to the even and odd numbered injectors respectively into a feed line 24. When the valves 19 and 21 are energised, fluid from the odd-numbered lines flows into the feed line 24. When the valves 20 and 22 are not energised, fluid from the even-numbered lines is directed into a drain line 25 via a pressurising valve 27.

When the valves 20 and 22 are energised and the valves 19 and 21 are not energised, the situation is reversed.

The drain line 25 leads to a reservoir 25*a* of test fluid.

The feed line 24 connects the isolating valves 21 and 22 to a measuring device 26 in the form of a piston and cylinder arrangement, via a filter 28 which prevents any solid particles entering the metering cylinder.

A drain line 32 connects the measuring device 26 to the test fluid reservoir 25*a* via a control valve 34 and a back pressurising valve 36. The back pressurising valve 36 maintains sufficient back pressure on the system to reduce the pump-up effect at the start of the next metering cycle, and also to prevent gas bubbles or vapour forming in the test fluid upstream of the valve when the metering unit is being drained.

The control valve 34 is selectively operable to start metering of the fluid by the measuring device 26.

A microcomputer 38 of the metering equipment is connected to receive electrical signals from the commencement of injection detector 12, an optical pick up 39 from the pump shaft 41, a thermister 40 positioned in the measuring device 26 to provide an indication of the temperature of test fluid therein, and an optical reading head 42 of the measuring device 26. The microcomputer is programmed to process the signals it receives from those various parts of the metering equipment to display useful information relating to the operation of the fuel injection system on test on a cathode ray tube 44 and also on a print-out 46, although it will be appreciated that the computer may be programmed to control many different forms of display.

The structures of the various parts of the metering equipment will now be described in greater detail.

Figure 2:
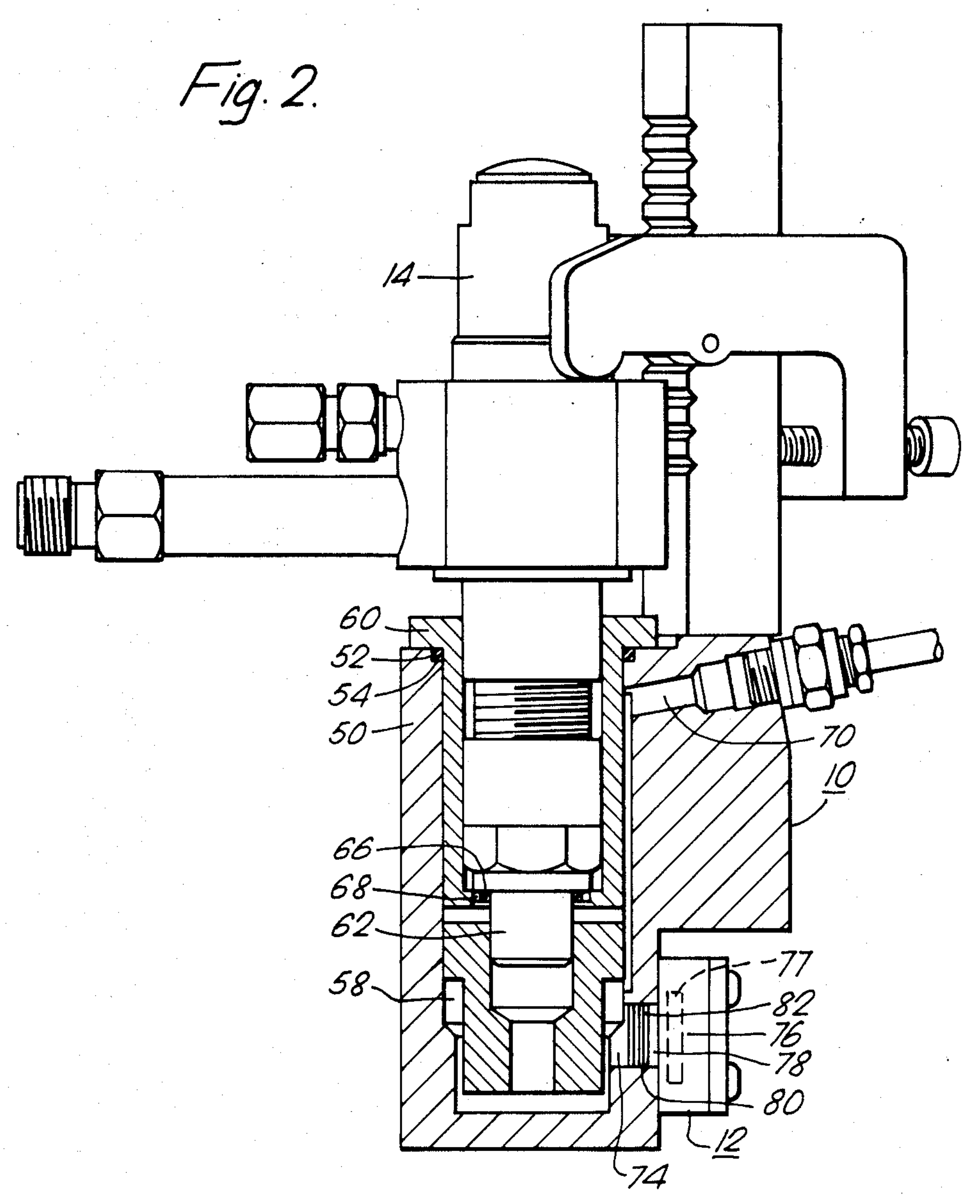
FIG. 2 is a longitudinal sectional view of an injector mounting block containing a commencement of injection detector.

A part of the injector mounting block 10 is shown in detail in FIG. 2. It comprises an injector mounting sub-block 50, which has eight mounting cavities 58 bored into it (only one of which is shown in FIG. 2).

Mounting inserts 60 are inserted into the cavities 58 each insert receiving the cylindrically formed end 62 of an injector 14. When the metering unit is in use a sealing connection between the injector 14 and the mounting sub-block 50 is effected by one O-ring 66 held in an annular seating 68 on the insert 60 and another O-ring 52 held in an annular seating 54 on the sub-block 50.

A duct 70 leads from each cavity 58 to the corresponding inlet connection 17*a* on the block 17.

For injector No. 1 only, a port 74 connects the mounting cavity 58 to a piezoelectric transducer 76. (It will be appreciated that the transducer could be arranged adjacent to any other one of the injectors instead of injector No. 1). A plunger 78 carries an O-ring 80 in a circumferential groove 82 which prevents test fluid passing from the cavity 58 to the transducer 76. The plunger 78 is urged, and possibly moved against the transducer 76 when the pressure in the cavity 58 increases as a result of test fluid being injected into the cavity by the injector 14.

It has been found that a very clear electrical signal is obtainable from the piezoelectric transducer if its piezogenerative crystal 77 is not clamped in position, that is to say it is retained loosely in the transducer.

Figure 3:
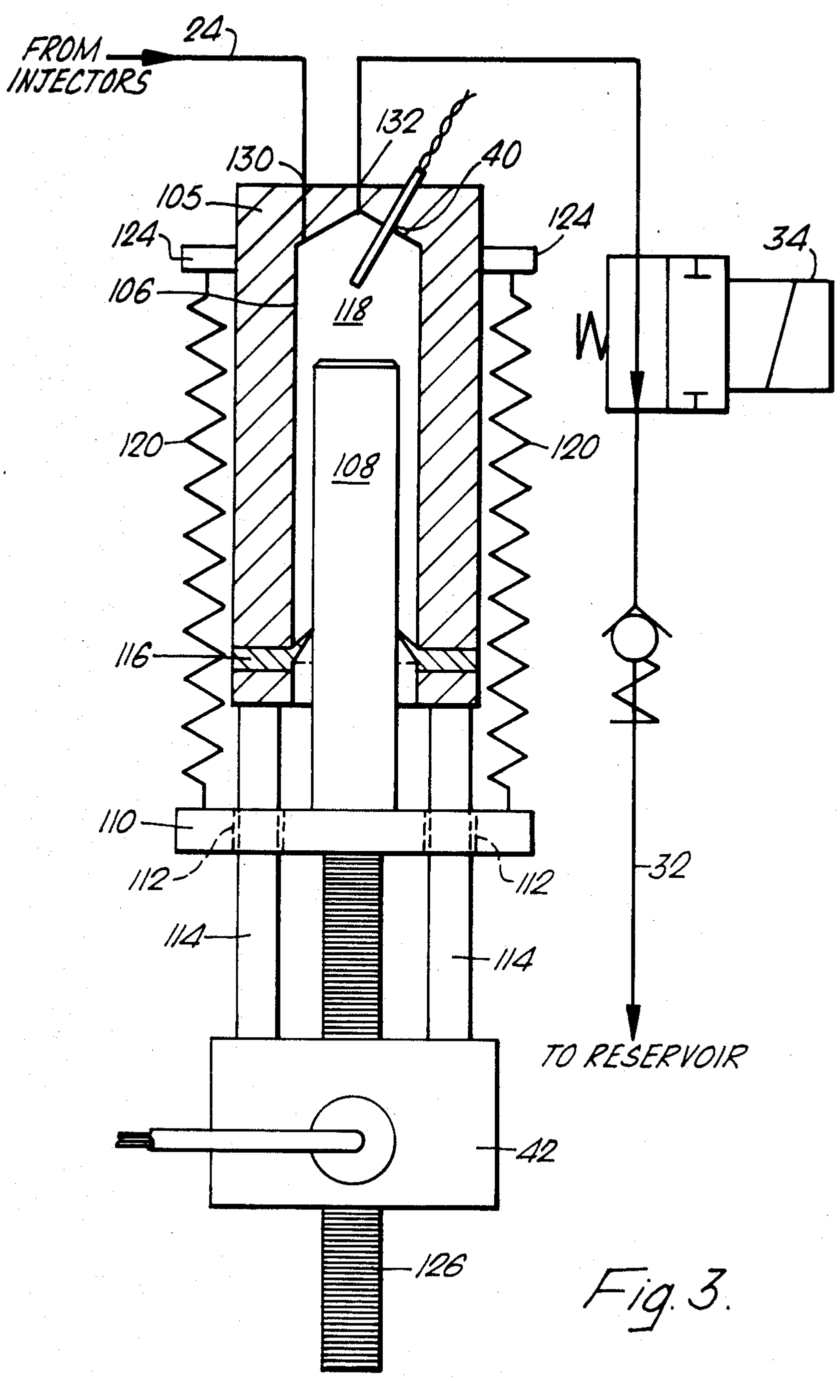
FIG. 3 shows fluid circuitry and an axial sectional diagrammatic view of a measuring device of the unit.

The measuring device 26 shown diagrammatically in FIG. 1 is shown in greater detail in FIG. 3 which shows its basic construction. It comprises a cylinder block 105 defining an internal cylinder 106 containing an accurately ground piston 108. One end of the piston 108 which projects from an open end of the cylinder 106 is fixed to a transverse bearing bar 110. The transverse bearing bar is formed with two through holes 112. Respective slide bars 114, which extend axially in relation to the piston and cylinder arrangement, extend through the holes 112 so as to constrain the bearing bar 110 to linear movement in an axial direction in relation to the piston and cylinder arrangement. A static PTFE (polytetrafluoroethylene) piston seal 116 is positioned at the open end of the cylinder 106 to form a seal around the piston 108 thereby to close a measuring chamber 118 defined between the piston 108 and the cylinder 106, and to aid in supporting the piston. Two low-rate piston-return tension springs 120 are each attached to the bearing bar 110 and to two respective spring hangers 124 to urge the piston 108 inwardly.

An optical grating bar 126 is fixed at one end to the centre of the bearing bar 110 and extends therefrom in the opposite direction to the piston 108 and in line therewith. This avoids possible shearing movement between the grating bar 126 and the piston 108 which might occur if the grating bar 126 were fixed to one side of the piston 108. The free end of the grating bar 126 extends underneath the optical reading head 42 of the measuring device.

The lines of the optical grating extend transversely of the axis of the piston and cylinder arrangement. Therefore, as the piston 108 is displaced linearly in relation to the cylinder 106, optical grating lines pass underneath the optical reading head 42 in succession. The optical grating lines are spaced apart by a distance of 20 microns. As the grating lines pass underneath a sensitive part of the optical reading head 42, the latter is caused to emit one pulse for every 1 micron of linear movement of the piston 108 by means of an interpolator.

The measuring device is connected to the fluid circuitry of the rest of the metering equipment by way of an inlet 130 to the measuring chamber 118, and an outlet 132 of the chamber 118. The inlet 130 is connected to the feed line 24, and the outlet 132 is connected to the drain line 32.

It will also be seen from FIG. 3 that the control valve 34, which is shown diagrammatically in that Figure, is a solenoid valve which is energised to close the drain line 32 from the chamber 118.

The piston 108 is of a light-weight construction to reduce its inertia, so as to increase its response to the flow of incoming test fluid, and to reduce its tendency to oscillate longitudinally at the end of an injection.

The operation of the metering unit will now be described in detail.

With the fuel injection system on test operating to inject test fluid into the metering unit, the fluid from the eight injectors 14 flows, via the sub-block 50 and the ducts 70 to the block 17. Until such time as either one or both of the diverter valves 19 and 20 are switched to cause test fluid to flow into the feed line 24, the fluid then flows back through the drain line 25 to the reservoir 25*a*.

When all eight injectors are to be tested together both diverter valves 19 and 20, and isolator valves 21 and 22 are energised causing the test fluid from all lines to flow into the feed line 24 via the filter 28. The filter 28 removes any particles present in the test fluid before it flows on to the measuring device. The test fluid now flows into the measuring chamber 118 and passes out via the outlet 132, to be returned to the reservoir 25*a* via the drain line 32, the pressurising valve 36, and the control valve 34. The pressurising valve 36 ensures that any air or other gases or vapours are kept in solution in the measuring chamber 118.

When a metering procedure is to commence control valve 34 is energised to close the drain line 32, and cause the test fluid flowing continuously into the metering cavity 118 from a succession of individual injections to displace the piston 108 linearly against the force of the low-rate return springs 120. This displacement causes an electrical pulse to be emitted from the optical reading head interpolator for every one micron displacement of the piston 108 as already mentioned. Thus, each pulse corresponds to a particular volume of test fluid delivered by one of the injectors 14. In particular, if, for example, the cross-sectional area of the piston 108 is 100 sq. mm, each pulse from the optical reading head interpolator corresponds to a volumetric output from the injector 14 of 0.1 cu. mm.

During these operations, the piezoelectric transducer 76 of the detector 12 is emitting signals. By means of circuitry which will be described in greater detail with reference to FIG. 9 the signals from the detector 12 are used to generate one pulse each time an injector injects fluid into the injector mounting block 10. For each injector, a train of pulses is thus produced on a line associated with that injector alone, so that a pulse for one injector is distinguished from a pulse for any other injector. Each pulse represents an instant which coincides, or very nearly coincides with a commencement of injection by the injector associated with that pulse. The trains of pulses for the different injectors are shown on lines (a) to (h) of the time graph shown in FIG. 4. The displacement of the piston 108 of the measuring device 26 is represented by the line (p) shown in FIG. 4 extending over the same time period. Its movement is stepped, the steps being caused by the successive injections from the injectors 14 so that the line (p) showing piston displacement plotted against time is approximately a step function. Each pulse on lines (a) to (h) representing a commencement of injection, is followed by a step in the line (p) representing the flow of fluid into the measuring chamber 118 caused by that injection. The fact that the function continually rises with each step is representative of the increasing displacement of the piston 108.

Figure 8:
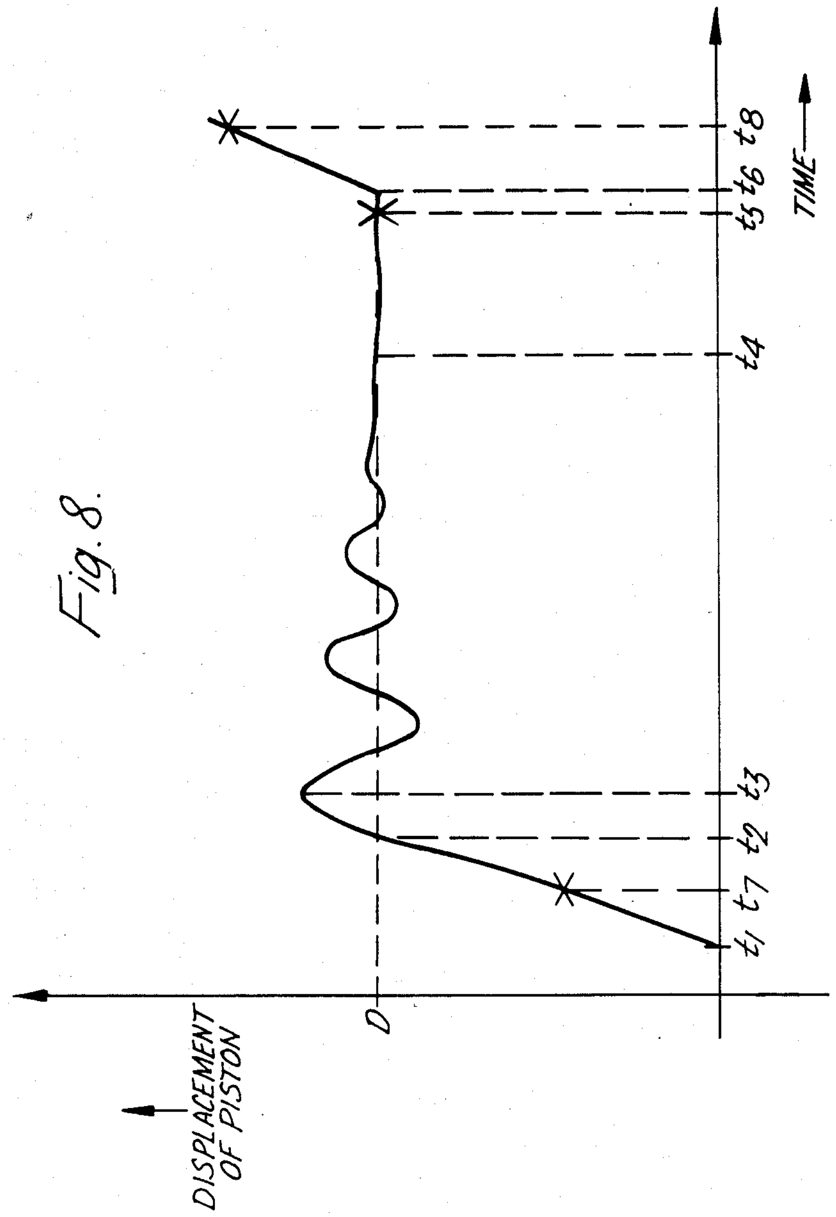
FIG. 8 shows a part of each graph shown in FIGS. 4 to 7 on a very much enlarged scale, piston displacement being magnified even more than time.

A more detailed representation of each step in the displacement of the piston 108 is shown in the graph of displacement plotted against time shown in FIG. 8. In this Figure, the start of one of the step movements of the piston 108 following an injection from one of the injectors 14 is represented by the point t1. At time t2 the injection of test fluid from the injector 14 stops, but displacement of the piston continues, due to the inertia and elasticity of the total system. At time t3, the restoring force exerted by the return springs 120 causes the piston to reverse direction of its linear motion. Linear oscillation of the piston continues in this way until time t4 when it reaches equilibrium and comes to rest. The point of the next injection is at time t5, and it will be seen that this occurs after t4, when the transient oscillatory motion of the piston 108 has decayed. This shows the significance of detecting the commencement-of-injection of an injector, in that at least for low and medium speeds of the fuel pump shaft of the injection system, it occurs at an instant when the measuring device 26 is quiescent. It occurs just before the piston 108 starts to move again under the effect of the injection at time t6 because of the finite time taken for a sound wave in the test fluid to travel from the injector mounting block 10 to the measuring device 26.

Figure 4:
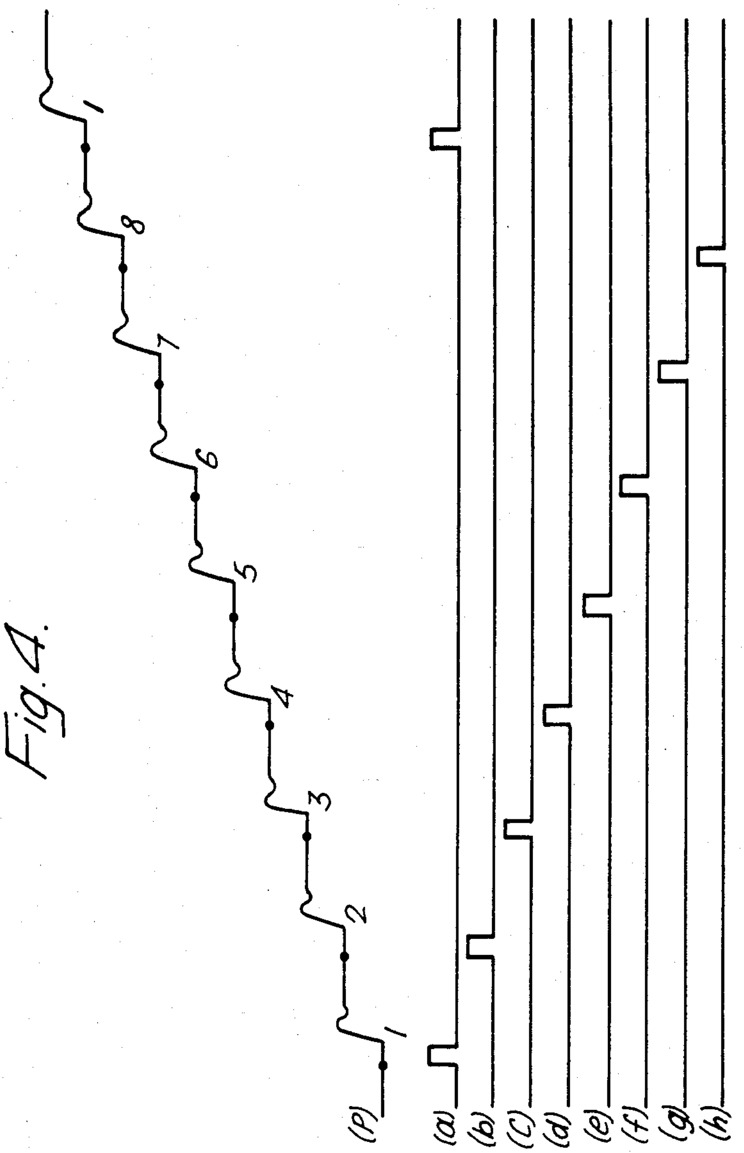
FIGS. 4 to 7 show graphs of piston displacement in the measuring device and commencement of injection signals plotted against time.
Figure 5:
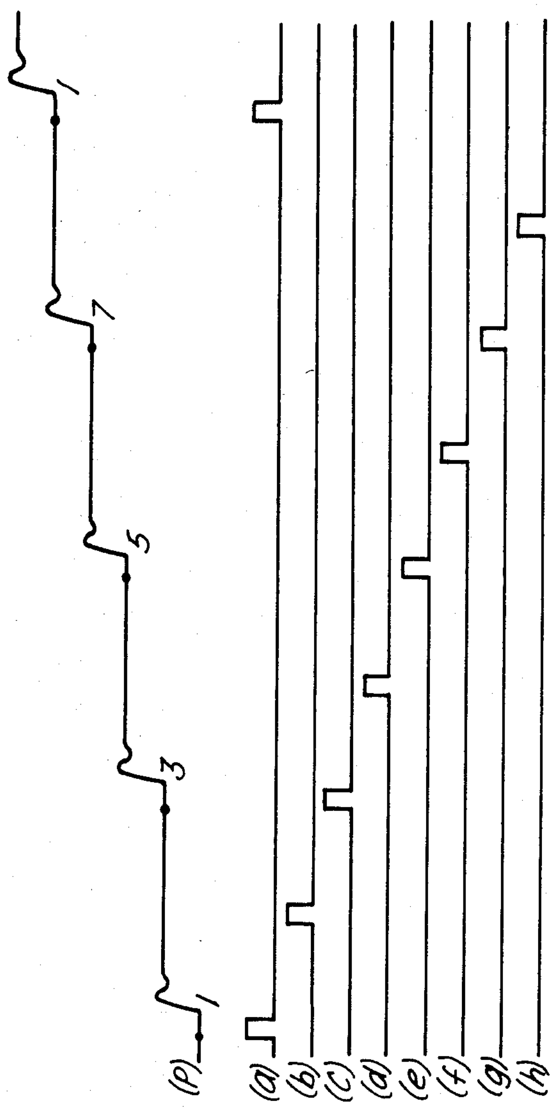
Figure 6:
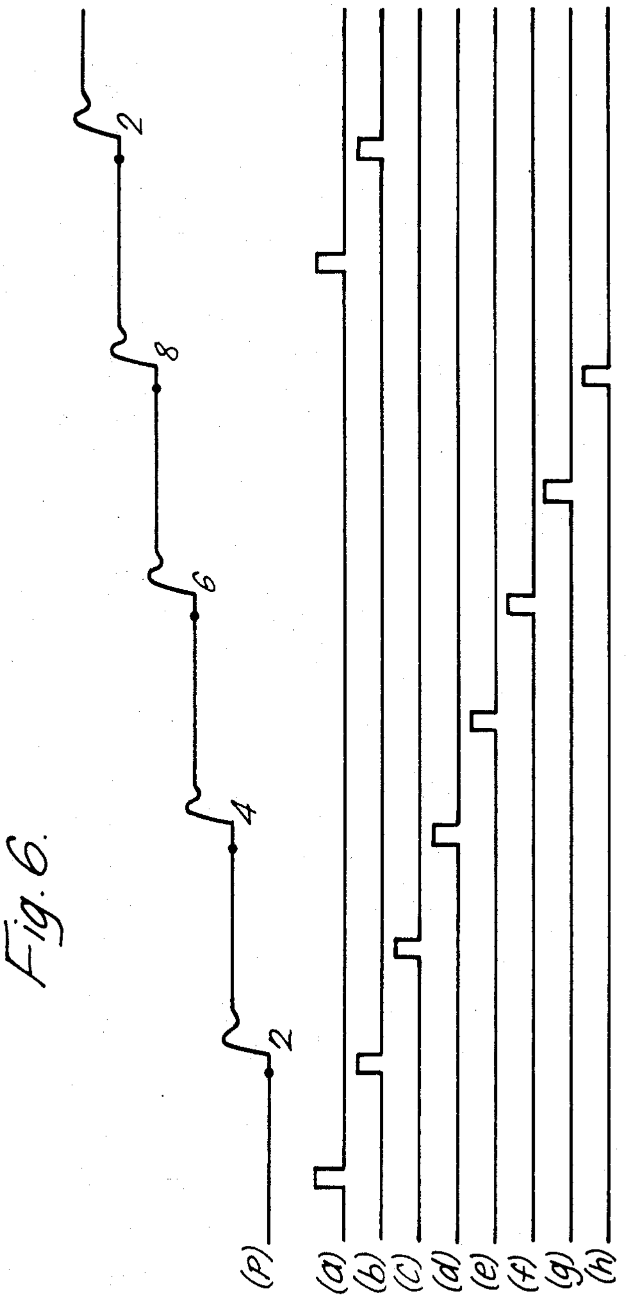

FIGS. 5 and 6 show graphs corresponding to FIG. 4, with only one of the diverter valves 19 and 20, respectively, open in relation to the feed line 24. Thus, FIG. 5 shows the piston displacement resulting from test fluid from only the odd numbered test injectors being passed to the metering device 26, and FIG. 6 the piston displacement resulting from test fluid from only the even numbered injectors being passed to the measuring device 26. The purpose of such switching of the diverter valves 19 and 20, under certain conditions of operation will be described hereinafter.

Figure 7:
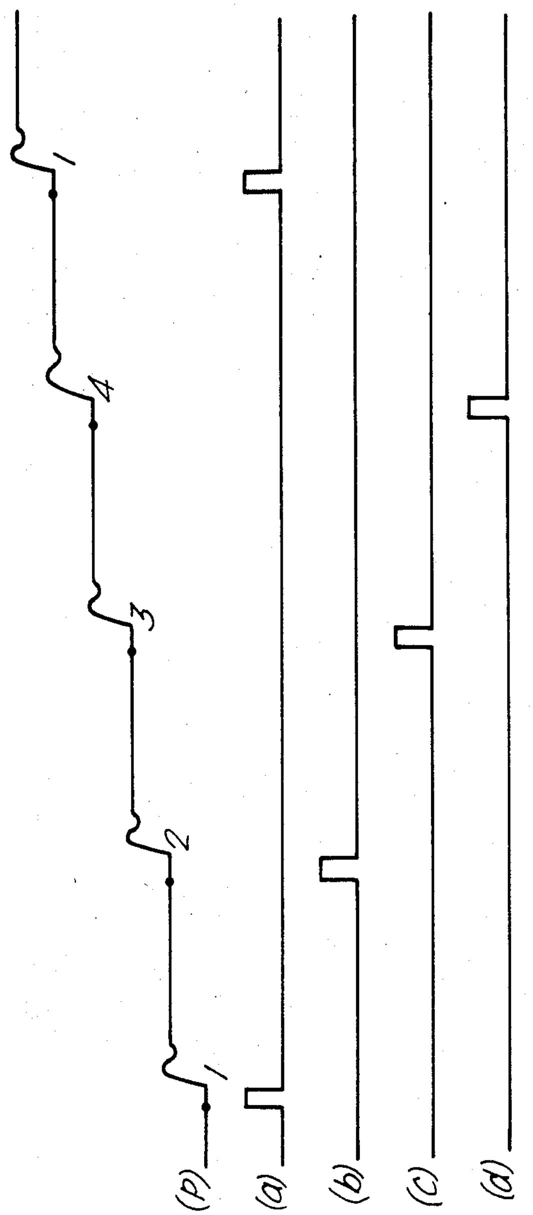

FIG. 7 shows a graph corresponding to FIG. 4 for a fourline fuel injection system.

Figure 9:
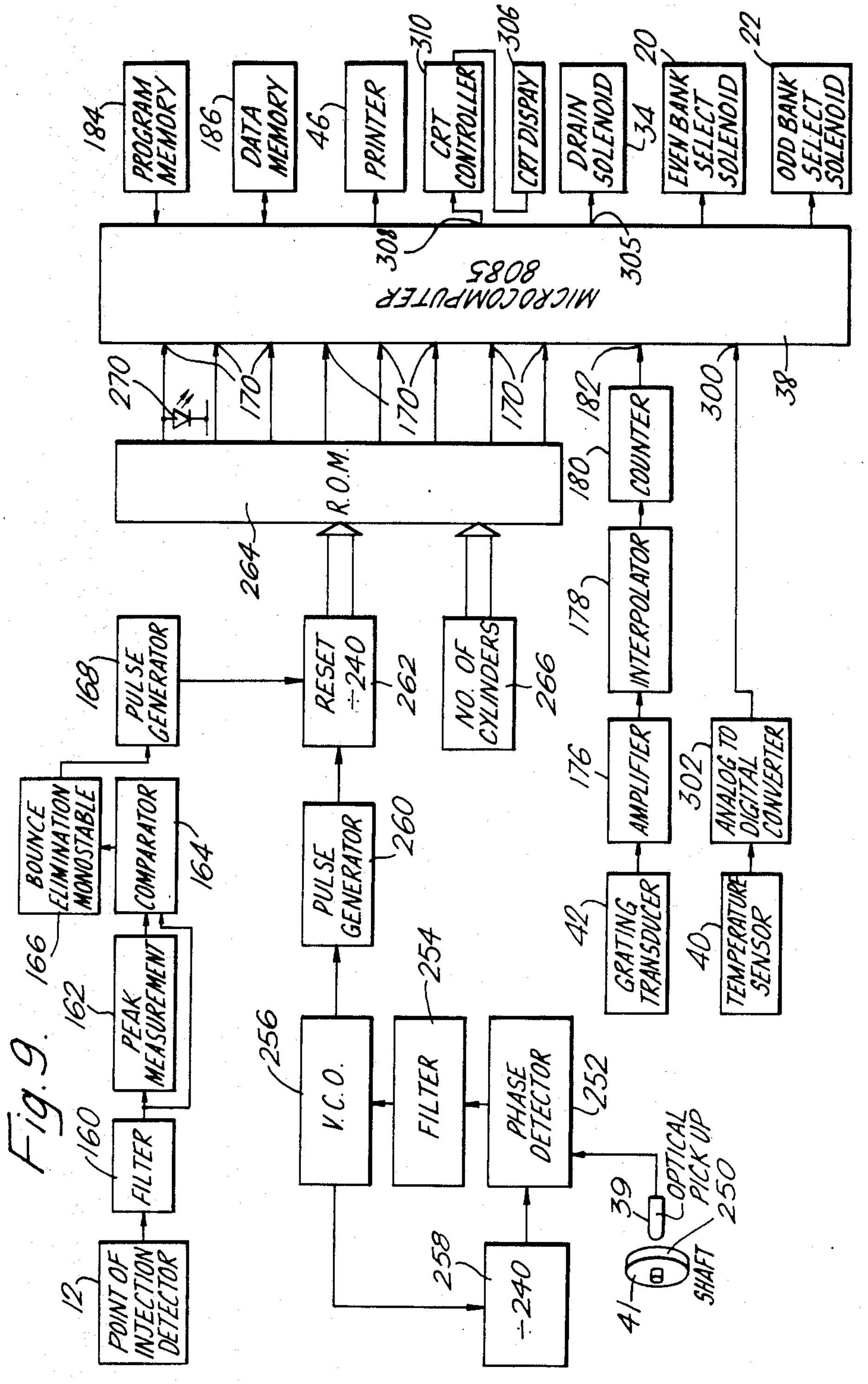
FIG. 9 shows a block diagram of electrical circuitry of the unit.

The circuitry in which the electrical output signals from the various components of the metering unit are processed is indicated by FIG. 9.

The output from the detector 12 is connected to feed signals to a signal conditioner comprising a filter 160, a peak measurement circuit 162, a comparator 164, a bounce elimination monostable 166, and a pulse generator 168. This conditioning circuit operates as follows. After the filter 160 has removed any high-frequency components from the incoming signal, its value is compared by the comparator 164 with a proportion of the peak value from the previous injection. If the signal is sufficiently close in value to the peak measurement at the time stored in the peak measurement circuit 162, the comparator 164 will allow the signal to pass on to the monostable multi-vibrator 166. This ensures that spurious signals do not give rise to a false commencement of injection pulse, whilst at the same time allowing for a variation in the magnitude of the output signal from the commencement of injection detector 12 with variation in the rate of injection. The bounce elimination monostable multivibrator 166 is switched to an on state for a sufficiently long period of time to ensure that bounce signals, whether created mechanically or electrically, are unlikely to occur when the multivibrator 166 switches back to its off state. A pulse signal generated by the pulse generator 168 on reception of the leading edge of the signal from the bounce elimination monostable multivibrator 166 will therefore correspond only to an actual commencement of injection, and not to any spurious signal resulting from mechanical, hydraulic or electrical bounce.

Figure 10:
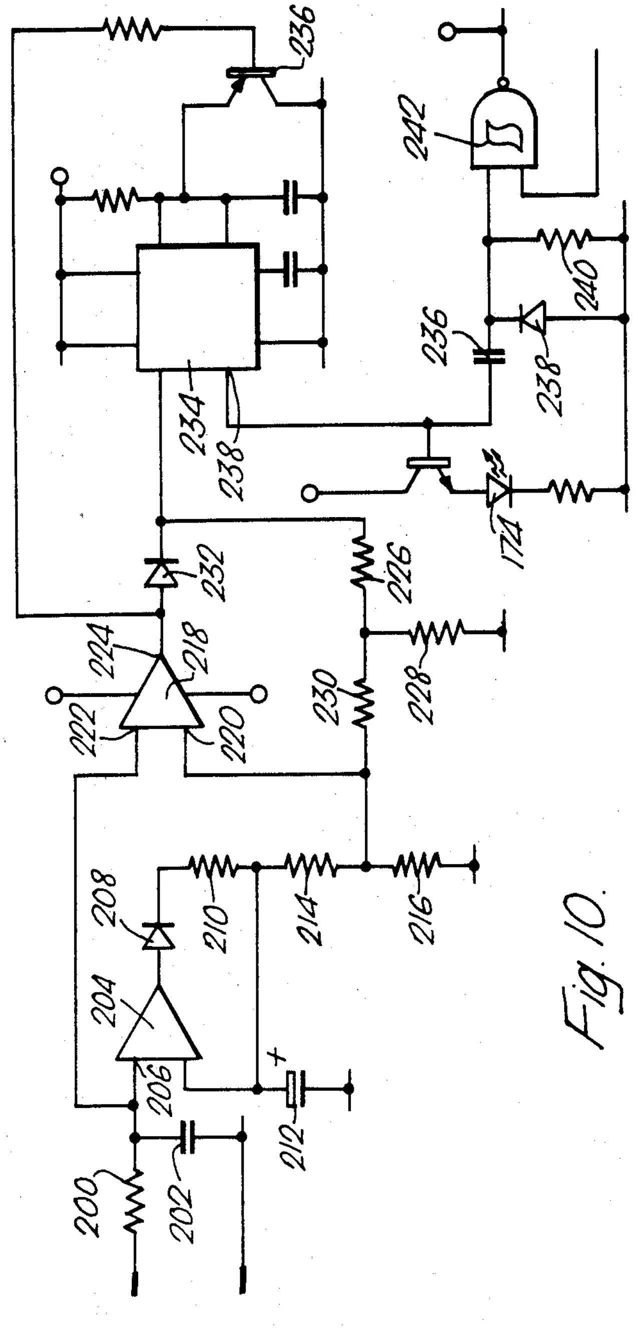
FIG. 10 shows a part of the electrical circuitry of FIG. 9 in greater detail.

One possible detailed structure of the commencement of injection signal conditioning circuit is shown in FIG. 10. Its structure and function will be described together for the sake of brevity. The signal from the detector 12 actually takes the form of a positive going spike followed by an oscillation at a lower amplitude which can last for a few milliseconds duration. The signal amplitude is a function of pump speed and delivery. For this reason, the threshold of the input circuitry if required to vary with the peak amplitude of the signal. A resistor 200 and capacitor 202 form a low pass filter to eliminate any high frequency noise from the signal. The signal is then fed to an integrated circuit 204 forming a peak measurement circuit in conjunction with a diode 208, a resistor 210, and a capacitor 212. When the input signal is greater than the voltage across the capacitor 212 then the current flows through the diode 208 and the resistor 210 to charge up the capacitor 212 until the voltage across it is equal to the input voltage.

At this point current stops flowing into the capacitor 212 because the diode 208 becomes reverse biased and the capacitor 212 stores a voltage equal to the peak input voltage. A slow discharge path is provided through resistors 214 and 216 which form an attenuator and provide an output signal at approximately two thirds of the peak amplitude. The values of the resistors 214 and 216 are chosen so that the discharge rate of the capacitor 212 is insignificant at the lowest operating speed.

The signal at the junction of the resistors 214 and 216 is used as one input 220 to the comparator formed by the integrated circuit 218 with inputs 220 and 222 and an output 224. The other input to the comparator is taken from the filtered signal from the detector 12, so the output 224 from the integrated circuit 218 switches low when the input signal exceeds two thirds of its peak value and returns to a high value when the input is below two thirds of the peak. In this way, any noise which is less than two thirds of the peak signal voltage is rejected by the circuit. A fast switching action of the circuit is accomplished by providing some positive feedback through the resistors 226, 228 and 230, and a diode 232.

The signal is then used to trigger a retriggerable monostable formed by an integrated circuit 234 and associated components. These are chosen to give a time period of approximately 8 milliseconds which is longer than the duration of a normal injection. If a second injection should occur within this time period the monostable will be retriggered by a transistor 236 and the time period will be extended by a further 8 milliseconds. This means that only one output pulse is generated from the circuit even when multiple injections may occur.

The output 238 from the circuit 234 is then taken to a differentiator circuit formed by a capacitor 236, and diode 238, a resistor 240 and an integrated circuit 242 which produces a negative going pulse of approximately 500 usecs at its output. The timing of this pulse coincides with the peak signal from the detector 12 which occurs right at the start of injection. At this point, the piston 108 has not yet started to move because there is a finite time required for the sound wave to travel from the injector 14 to the measuring device 26, so that the maximum amount of time has been left for the piston to settle from the previous injection.

Referring back to the block circuit diagram shown in FIG. 9, the electrical output from the optical reading head 42 is fed, via an amplifier 176 and an interpolator 178, to a counter 180 which provides a signal at an input 182 to the microcomputer 38 indicative of the actual displacement of the piston 108 at any given instant. The microcomputer is programmed by a program memory 184 to feed the information provided at the displacement indicating input 182 to a data memory selectively according to the pulses it receives on its commencement of injection inputs 170. Thus, the movement of the piston given by the input 182 between input pulses received by the computer successively at the inputs 170 corresponding to, say, the second and third injectors, is attributed to the second injector. That movement is stored in that store of a 2K5 bytes random access memory 186 which is associated by the program memory 184 with the second injector. This allows for the fact that the displacement signal at the input 182 at the instant a commencement-of-injection signal is received at one of the inputs 170 is indicative of the position of the piston 108 after the immediately preceding injection.

In this way, the signals from the measuring device 26 relating to each of a succession of individual injections are determined, and the sizes or volumes of each injection and the identity of the injector responsible for that injection may be stored in the RAM 186, as may the total volume of test fluid injected by each injector over any given period of time or for any predetermined number of injections, by summing means within the unit. This allows for the fluid from the injectors of an eight-line system to be metered together.

The manner in which the commencement of injection signals are produced at the inputs 170 of the microcomputer 38 is as follows:

Signals from the optical pick up 39, occurring in the illustrated equipment once per revolution of the pump shaft 41 by means of a white patch 250 on the shaft, are fed to a phase locked loop comprising first a phase detector 252, then, connected in series therewith, a filter 254, a voltage controlled oscillator 256 and finally, to complete the loop, a divider 258 having an output connected to a further input to the phase detector 252. The voltage controlled oscillator 256 generates a wave form having a frequency 240 times that received at the phase detector input. The phase detector 252 generates a signal according to any difference in the phases between the signals at its two inputs. As a result, the voltage controlled oscillator 256 generates a wave form locked in phase with the signal from the pick up 39, but with 240 as many peaks per unit time. These are fed via a pulse generator 260 to a binary counter 262. This counts the pulses received from the pulse generator 260, up to 240, and is reset by a signal from the pulse generator 168 following detection by the detector 12 of a commencement of injection on line 1. The eight outputs of the binary counter 262 are connected to a read only memory 264. Further inputs 266 to this memory 264 provide an indication of the number of cylinders, or injectors, on test. From these inputs, the read only memory 264 generates signals on lines 170 corresponding to the lines on test, with the correct phase. Each input 170 is associated with an injector on test in this way, the pulses delivered to one input 170 corresponding to instants at the commencement of injection of one particular injector.

The ROM 264 has associated circuitry which does this by dividing the 240 count from the counter 262 by the number of lines on test as indicated by the inputs 266. With eight cylinders, for example, the ROM 264 will produce a pulse at the top input 170 to the microcomputer 38 on count 240, on the second line on count 30, third line on count 60, fourth on 90, fifth on 120, sixth on 150, seventh on 180 and eighth on 210. Naturally, with seven lines on test, since 240 is not exactly divisible by 7 some of the pulses on the inputs 170 will not precisely coincide with commencements of injections. Nonetheless, provided such pulses are forward in time relative to the associated commencements of injections, they will still occur during "quiescent" periods of the measuring system, and will in any case occur substantially at commencements of injections.

Light emitting diodes 270 are connected between each output of the read only memory 264 and earth, to give a visual indication of when a commencement of injection signal is issued for a given line.

One refinement incorporated in the illustrated metering unit is the provision of means for correcting for changing temperatures of test fluid from the injectors, to take account of volumetric expansion and contraction of the test fluid with varying temperatures. Previously this was done by means of an intercooler in the feed line 24 arranged to bring the temperature of the test fluid to a nominal 40 degrees Centigrade before being passed to the measuring device. With the illustrated measuring unit this would give an undesirable increase in the length of the feed-line 24, resulting in increased time for transients to decay following an injection. Instead, the temperature sensor 40 is connected to the microcomputer 38 at an input 300 thereof via an analogue-to-digital converter 302, to provide the computer with a digital representation of the temperature of the test fluid inside the measuring chamber 118. The computer 38 is programmed to correct the volumetric values represented by the signals of the input 182 to give values that would be obtained if the test fluid in the measuring cavity 118 were at 40 degrees Centigrade, for example. The mathematical formula stored in coded form in the program memory to direct the computer 38 to effect this correction is $$VT1 = VT2[1 + b(T2 - T1)]$$

where:

T1 is the nominal test fluid temperature, in this case 40 degrees Centigrade;

T2 is the actual test fluid temperature;

b is the coefficient of volumetric expansion of the test fluid with temperature;

VT2 is the measured volume at temperature T2; and

VT1 is the computed volume corrected to temperature T1.

In the event that the rotary speed of the injection system pump shaft exceeds a predetermined value, the interval between two successive injections will be less than the time between the instants t1 and t4 in FIG. 8, being the time for the piston 108 to become stationary after any particular injection. The information processed by the computer 38 would then be erroneous.

To prevent false measurements being made in this way, the computer 38 is programmed by the program memory 184 to detect when the rate of successive injection signals it receives exceed a predetermined value. At this stage, the computer 38 issues a signal first to the solenoid valves 19 and 21 for the odd-numbered lines and, when a metering procedure has been completed for those solenoid valves, to the even-numbered line solenoid valves 20 and 22. This results in the metering procedure described herein being executed first for the odd numbered injectors only, and then for the even numbered injectors, giving rise to the timing illustrated in FIGS. 5 and 6. As already mentioned, the injectors are numbered in this respect in pumpline delivery order. It will be seen from FIGS. 5 and 6 that, when a signal is delivered by the computer 32 for example for the even numbered injectors, the piston 108 only moves in steps according to signals corresponding to the odd numbered detectors, represented in lines (a), (c), (e) and (g) of FIG. 5. Similarly for the even numbered injectors as shown in FIG. 6, where the effective signals occur in lines (b), (d), (f) and (h).

Every time the computer 38 recognizes that the piston 108 has reached its maximum displacement, it issues a signal from its output 305 to the drain solenoid valve 34.

The information thus stored in the computer 38, in accordance with the program stored in the program memory 184, is displayed on the print-out 46 and a cathode-ray-tube display (CRT display) 306. The latter is connected to a display control output 308 of the computer 38 via a video CRT controller 310.

Figure 11:
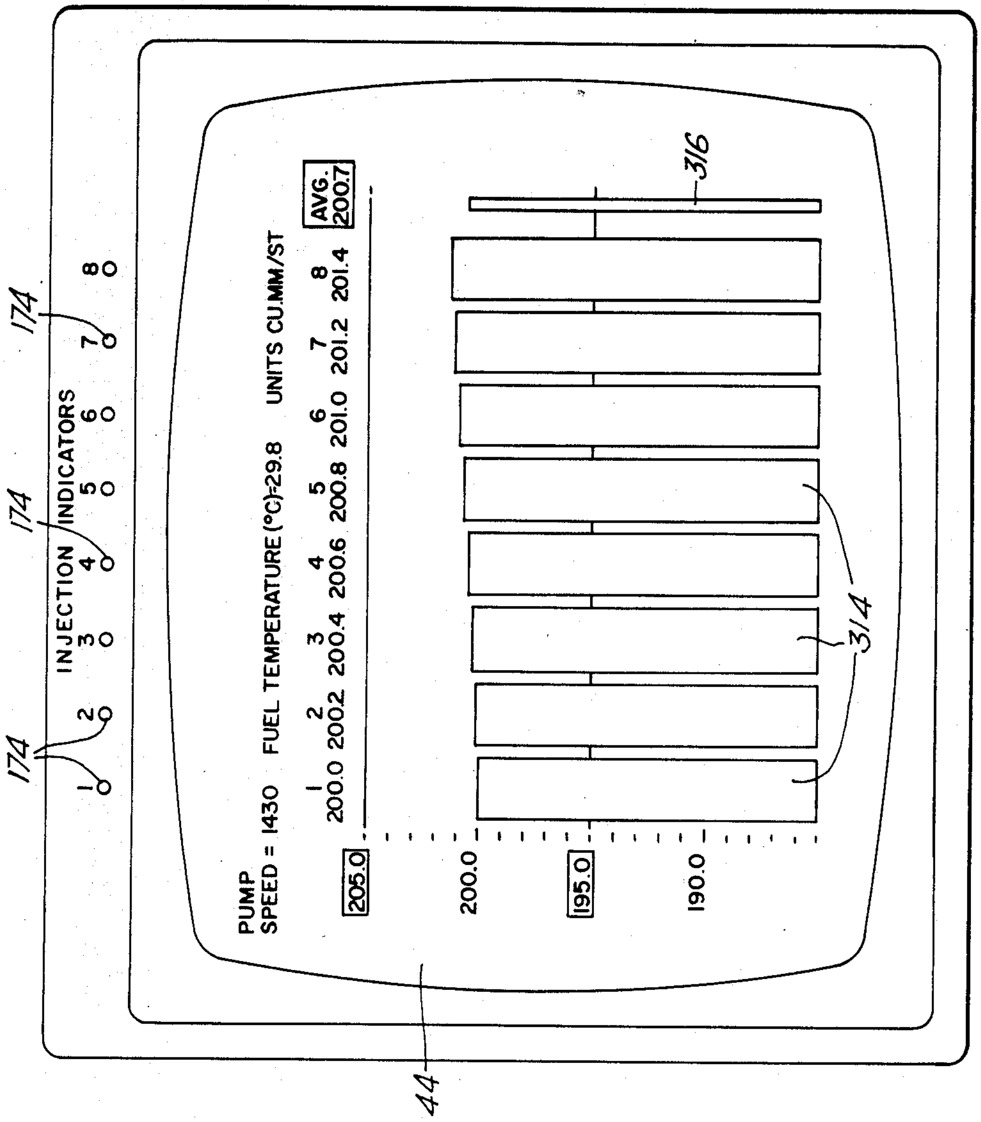
FIG. 11 shows the format of a video display produced on a cathode ray tube of the unit.

The actual layout of the possible display on the CRT display 306 is shown in FIG. 11. Above the actual cathode ray tube 44 are arranged the light-emitting diodes 174 for easy observation by the operator. In this particular display, the measured volume of test fluid delivered by each injector is illustrated as a block graph in the form of respective blocks 314, one in relation to each injector. A further, thinner block 316 represents the average value for all the injectors. Above the block graph is further information measured by the various components already described, the signals from which are processed by the computer to be displayed on the screen as illustrated in FIG. 11.

Although a measuring device has been described which issues an electrical pulse for every micron travel of the piston, and this is the preferred construction, it will be appreciated by those skilled in the art that the measuring device could include a displacement transducer that provides an analogue signal, in which case the equipment would be adapted so that means are provided for determining which of the values of the analogue signal relate to each of a succession of individual injections.

A variety of modifications are possible as follows:

(1) There may be 120 equi-angularly spaced marks on the pump shaft 250 in which case the divider 258 and the counter 262 will divide by 2.

(2) There may be 240 equi-angularly spaced marks on the pump shaft 250 in which case the output from the optical pick up 39 may be connected directly to the pulse generator 260, dispensing with the phase locked loop.

(3) Returning to the construction of equipment described and illustrated in earlier U.S. Pat. No. 4,453,403, the construction illustrated therein may be modified so that instead of providing two diverter valves, eight are used, one for each line, by means for example of a diverter valve arrangement illustrated in FIG. 1 of earlier U.S. Pat. No. 4,362,052 (filed on 30th Apr., 1981). Such a modification may be operated (a) by using the computer to operate the diverter valves to switch in the next injector every 50 shaft revolutions, for example, or (b) by using the computer or other control means to switch in one line only. A non-return valve may be provided downstream of the diverter valves, or each diverter valve, on the return to tank line to ensure pressure in the valves is maintained even when the line concerned is by-passed, so that no pump up effect occurs when that line is switched in.

(4) Modifying the equipment described and illustrated in earlier U.S. Pat. No. 4,453,403 by having one measuring unit per bank of four lines, or one measuring unit per line, enabling each injector to be tested individually.

One of the disadvantages of the equipment described with reference to FIGS. 1 to 11 is that the different lines of the multi-line fuel injection pump have to be connected in the right order to the inputs of the equipment.

Figure 12:
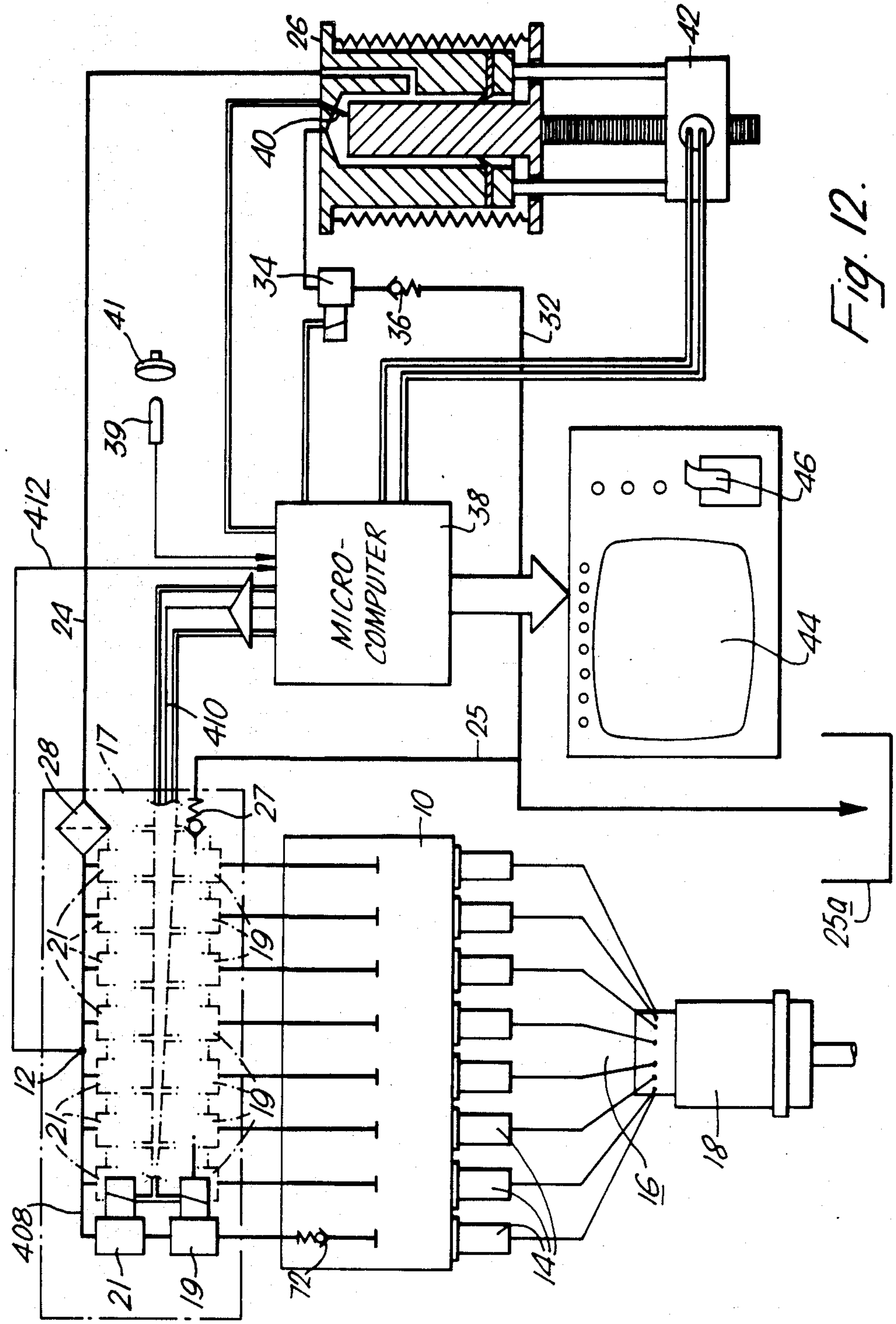
FIG. 12 is a schematic diagram of a modified unit.

One way of overcoming this problem is by modifying the equipment in accordance with FIGS. 12 and 13. For these Figures, which are similar to FIGS. 1 and 9 respectively, like parts have been given the same reference numerals, and only the differences between this modified equipment and that illustrated in the earlier Figures will now be described.

Considering first the fluid circuitry illustrated in FIG. 12, instead of having one pair of solenoid valves 19 and 21 shown in FIG. 1 for, say, the even lines, and another pair of solenoid valves 20 and 22 for the odd lines, there is one pair of solenoid valves 19 and 21 for each line. Only one pair is fully illustrated in FIG. 12 for the first line, the other pairs shown in ghosted form only so as not to make the Figure too obscure. Thus the two valves of each pair 19 and 21 are connected in series with one another with the valve 19 connected to its respective input of the equipment, and the output from the valve 21 connected to a feed line 24 via the filter 28 and a common gallery 408 in the manifold block 17, the feed line 24 thus being common to all the valves 21. Each valve 19 and 21 has its solenoid connected for selective operation by the micro-computer 38 via lines 410. The drain outlets from the valves 19 are each connected to a common drain line 25 via the pressurising valve 27. The commencement of injection detector 12 is positioned in the gallery 408, and its electrical output is connected to the micro-computer 38 by way of an electrically-conductive line 412.

The details of the electrical circuitry of this modified equipment are illustrated in FIG. 13. The pulse generator 168 in FIG. 13 has its output connected directly to the micro-computer 38 rather than to the binary counter 262 of FIG. 9. The ROM 264 in FIG. 9 is dispensed with (its function being taken over by random access memories within the computer 38). The pulse generator 60 is connected to two counters 662 and 664 both of which having outputs connected to the micro-computer 38, and each counter 662 and 664 having a reset input connected to a respective output of the micro-computer 38. The interpolator 178 has its output connected to a further counter 668 which also has its output connected to the micro-computer 38.

Lastly, an injection data output 666 is connected to the micro-computer 38, and enables not only the number of cylinders to be entered, but also the relative normal phase angles between the successive injections in the ordered firing of the cylinders.

The equipment of FIGS. 12 and 13 operates as follows:

The fuel injection pump has its lines connected in any order to the mounting block 10. The pump is then set into operation with the equipment switched on and the micro-computer 38 closing all the valves 21 so that the test oil from the lines of the pump flows into the drain line 25 at this stage. The pulse generator 260 generates 3,600 pulses per revolution of the pump shaft 41. The counter 664 automatically resets every time it reaches 3,600, corresponding to one complete turn of the pump shaft 41. In addition, the counter 664 may be reset to "0" by the computer 38 at the instant the latter receives a pulse from the generator 168. Any intermediate value of the count from the counter 664 therefore represents a particular angular position of the shaft 41.

To determine the order in which the fuel injection pump lines have been connected to the inputs of the equipment, the micro-computer first performs a preliminary routine by switching the solenoid valves 20 and 21 of the first line only of the mounting block 10 through to the gallery 408. The computer 38 now receives pulses from the generator 168 indicative of instants of injection for the first line only, and uses these to reset the counter 664. It now switches in the second line to the gallery 408 to the exclusion of all the other lines, so that pulses from the generator 168 now occur at the instants of injection for the second line only in the mounting block 10. From the value of the count that the computer receives from the counter 664 at these instants, the computer can ascertain the relative phase between injections into the first line of the block 10 and those into the second line thereof. By repeating this process for the 3rd, 4th, 5th and successive lines of the block 10, the computer can ascertain the order in which the lines of the fuel injection pump have been connected to the lines of the mounting block 10.

The number of cylinders and the relative phases between injectors is now fed into the computer by way of the injection data input 666.

To perform a metering operation, the computer resets the counts in both counters 662 and 664 by a pulse or synchronising signal from the detector 12 for the No. 1 line, say, of the block 10. At this stage it is possible for all the valve pairs 19 and 21 for all the inputs to be open, since the computer now knows which pulse from the detector comes from which line. After a period of time has elapsed sufficient for the measuring device 26 and the various passageways to have attained a desired pressure, it allocates counts from the counter 180, indicative of the volume of liquid received by the device 26, to each one of a number of buffer memories in the computer 38 respectively associated with the different lines of the pump. The computer achieves this as follows. From the foregoing preliminary routine the computer knows the order in which the pump lines have been connected to the mounting block inputs, and therefore which of its buffer memories is associated with which line. It has also ascertained, either from the preliminary routine or directly from the data fed in through the input 666, what the normal relative phases between successive lines are. According to that information, it resets the counter 662 at the end of a count corresponding to the relative phase angles. For example, with 3,600 pulses or timing signals per pump shaft revolution from the generator 260, with a pump for an eight cylinder engine, and with equal angular spacing between successive injections, the counter 662 is reset after every 450 pulses it receives. It may do this by counting down from 450 every time it is reset, issuing an indicator signal when it reaches zero, and automatically resetting itself by that very signal to start a further downwards count from 450. Alternatively, the indicator signal and/or the resetting may be generated within the computer itself. If the phases between the different lines varies, the counter 662 will be reset accordingly, for example, to count downwards from 450, then from 350, then from 450 and so on. The count from the counter 180 between two successive indicator signals from the counter 662 therefore provides a measure of the volume of liquid received by the measuring device 26 owing to an injection into the line responsible for the first of these two indicator signals. That count is accordingly stored by the computer 38 in that one of its buffer memories associated with that line.

It will be appreciated that this metering procedure can continue some time after the initial reset by a synchronising signal has occured, and it may not be necessary to reset the counters 662 and 664 more often than, say, every metering cycle of 50 or 100 pump shaft revolutions.

Furthermore, in the event that the rotary speed of the pump shaft exceeds a given threshold value, the computer may automatically switch out either the odd-numbered lines or the even-numbered lines.

Even though there is only one commencement-of-injection detector 12 for all the lines, it is still possible to measure accurately the relative phases of the different lines. This is performed by the computer 38 as follows. Every time it receives a signal from the pulse generator 168, it resets counter 668 to count downwardly from a fixed threshold value. When the counter reaches zero, it issues a phase detection signal. This corresponds to an instant immediately following a commencement of injection when an amount of liquid has flowed into the measuring device 26 corresponding to the aforesaid threshold value. In FIG. 8, two such instants are illustrated at t7 and t8. The count from counter 664 received by the computer between instants t7 and 78 is a precise measure of the phase angle between injections immediately prior to t1 and t6.

We claim:

1. Fuel injection system monitoring equipment for metering the outputs from the different lines of a multi-line fuel injection system, comprising (a) a plurality of inputs to which respective lines of a multi-line fuel injection system are connectable, (b) a single commencement of injection detector for at least one of the lines positioned to detect the commencement of injection of that line and to issue a commencement of injection signal upon such detection, (c) a commencement of injection pulse generator connected to receive commencement of injection signals from the commencement of injection detector and to issue a commencement of injection pulse upon receipt of a signal from the commencement of injection detector, (d) a fuel injection pump running speed indicator which serves to pick up the rotational speed of the pump shaft and to issue indicator pulses at an output of the running speed indicator, at a rate which is proportional to that rotational speed, (e) a counter having an input connected to receive the said indicator pulses to provide a count of such pulses received by the counter, and a reset input connected to receive commencement of injection pulses from said commencement of injection pulse generator, so that the counter is reset when it receives a commencement of injection pulse, (f) an artificial commencement of injection pulse generator connected to said counter to generate an artificial commencement of injection pulse in dependence upon the count in the counter having a predetermined value representing a predetermined fraction of the time interval between two successive real commencement of injection pulses, whereby artificial commencement of injections pulses are generated for at least one line other than said one of the lines, (g) volumetric measure means connected to receive liquid from all the inputs and to produce metering signals indicative of the volume of liquid which passes into said measure means from the different lines, and (h) volumetric measure indicator means connected to receive pulses from said artificial commencement of injection pulse generator and to receive signals from said volumetric measure means, to provide an indication of the volume of liquid received by said volumetric measure means between two successive pulses from said artificial commencement of injection pulse generator.

2. Equipment according to claim 1, wherein said predetermined fraction is a time division of said time interval performed by a phase locked loop connected to receive signals from said detector.

3. Equipment according to claim 1, wherein said predetermined fraction is determined as an angle division of a complete pump shaft revolution performed by a counter which receives a number of pulses from a pump shaft optical pick-up per revolution of the pump shaft, that counter being reset each time it receives a signal from said detector.

4. Equipment according to claim 1, wherein selectively operable valves are provided downstream of the said inputs, with at least one valve per input, and wherein the commencement of injection detector is positioned to detect the commencement of injection of any and every line according to the operative state of its associated valve, and to issue a commencement of injection signal upon such detection, and wherein the equipment is selectively operable in a first mode, in which said computer is reset every time it receives a signal from the said running speed indicator indicative of a complete revolution of the pump shaft, so that the count of the counter at the time a commencement of injection signal is issued when the valves are in such states as to permit fluid from only one line to affect said commencement of injection detector is indicative of the phase of that line, to enable the equipment to ascertain in which order the lines of the pump have been connected to the lines of the equipment, or in a second mode in which the equipment operates as set out in claim 11, the said counter being reset by signals from a selected one of the lines only.

5. Equipment according to claim 4, further comprising threshold means to detect when a predetermined amount of fluid has passed to the volumetric measure means following a commencement of injection signal, and to provide a phase signal upon such detection whereby the count in said counter between successive such phase signals is indicative of the relative phases between the two lines giving rise to these successive phase signals.

6. Equipment according to claim 1, wherein said predetermined fraction is a time division of said time interval performed by a phase locked loop connected to receive signals from an optical pick-up adjacent to the pump shaft.

7. For use in metering the outputs from the different lines of a multi-line fuel injection system, commencement of injection indicator circuitry for providing signals indicative of the commencements of injection in the various lines comprising (a) a single commencement of injection detector for at least one of the lines positioned to detect the commencement of injection of that line and to issue a commencement of injection signal upon such detection, (b) a commencement of injection pulse generator connected to receive commencement of injection signals from the commencement of injection detector and to issue a commencement of injection pulse upon receipt of a signal from the commencement of injection detector, (c) a fuel injection pump running speed indicator positioned to pick up the rotational speed of the pump shaft and to issue indicator pulses at an output of the running speed indicator, at a rate which is proportional to that rotational speed, (d) a counter having an input connected to receive the said indicator pulses to provide a count of such pulses received by the counter, and a reset input connected to receive commencement of injection pulses from said commencement of injection pulse generator, so that the counter is reset when it receives a commencement of injection pulse, and (e) an artificial commencement of injection pulse generator connected to said counter to generate an artificial commencement of injection pulse in dependence upon the count in the counter having a predetermined value representing a predetermined fraction of the time interval between two successive real commencement of injection pulses, whereby artificial commencement of injection pulses are generated for at least one line other than said one of the lines.

* * * * *